Figure 1:
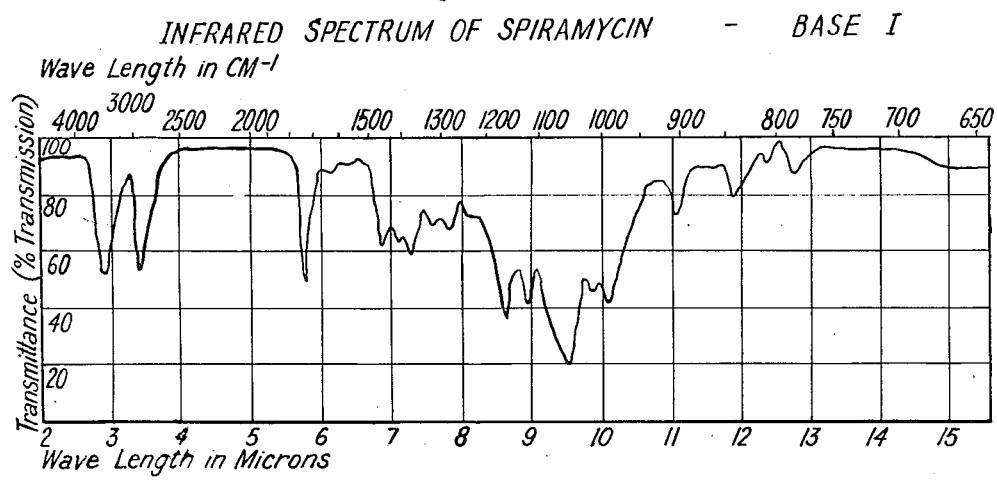

INFRARED SPECTRUM OF SPIRAMYCIN — BASE I

INFRARED SPECTRUM OF SPIRAMYCIN — BASE II

United States Patent Office 3,000,785
Patented Sept. 19, 1961

3,000,785
SPIRAMYCINS AND THEIR PRODUCTION
Leon Ninet, Sylvie Pinnert, and Jean Preud'homme, Paris, France, assignors to Societe des Usines Chimiques Rhone-Poulenc, Paris, France, a French body corporate
Filed Jan. 12, 1956, Ser. No. 558,753
Claims priority, application France July 31, 1953
8 Claims. (Cl. 167—65)

This invention relates to new antibiotic substances and to processes for preparing the same. This application is a continuation-in-part of Serial No. 441,634, filed July 6, 1954, and now abandoned.

The principal new antibiotic substance of the present invention, which is hereinafter referred to as "spiramycin," is obtainable by the fermentative growth of a particular micro-organism, as hereinafter described. It consists, as hereinafter explained, of three constituents herein identified as spiramycin I, spiramycin II and spiramycin III.

The base spiramycin exists in the form of an amorphous white powder; its acid addition salts, for example the sulphate or hydrochloride, can be isolated in the solid state. It is soluble in chlorinated solvents, alcohols, hexane, aromatic hydrocarbons such as benzene, ketones, ethyl acetate and amyl acetate. The sulphate is soluble in water and lower aliphatic alcohols, such as methanol, ethanol and butanol. The elementary analysis of the base shows that it contains only the elements C, H, O and N, and several analyses of samples of the base have given the following values:

|  | Percent |
|---|---|
| Carbon | 60 to 61 |
| Hydrogen | 8.9 to 9.4 |
| Oxygen | 25.5 to 27 |
| Nitrogen | 3.3 to 3.6 |

Using the countercurrent distribution method and apparatus of Craig (Journal of Biological Chemistry, 155 (1944), page 519), employing cyclohexane and an aqueous solution of spiramycin containing 1% of disodium phosphate, it has been possible to show the presence of three constituents; however, these three substances appear very closely to resemble one another as to composition, chemical properties and antibacterial activity. The molecular weight of the base, calculated from its neutral equivalent or by estimation of sulphate ions in the sulphate, lies between $(400)_n$ and $(450)_n$. The determination of the molecular weight by Rast's method indicates that $n=2$. The nitrogen content also gives a figure within these limits which indicates that all of the nitrogen is basic. The base gives negative tests in the following reactions: Sakaguchi reaction, Molish reaction, reaction with ninhydrin, reaction with ninhydrin after acid hydrolysis, reaction with Fehling's solution, biuret reaction, ferric reaction of maltol and ferric reaction of maltol after alkaline hydrolysis. With concentrated strong acids, it gives a violet-pink colouration. The base is optically active and its solutions in chloroform or ethyl alcohol are laevorotatory; $[\alpha]_D^{20}=-72°$ (c.=2%, ethanol). Its absorption spectrum (ethyl alcohol solutions) in the ultra-violet has a single maximum at 231 m$\mu$ ($E_{1\,cm.}^{1\%}=346$ for a specially purified specimen)

which distinguishes it from erythromycin (280 m$\mu$) and carbomycin (240 m$\mu$), which it resembles in its antibacterial spectrum. It is also distinguished from these two antibiotics in that bacteria rendered resistant to spiramycin retain a partial sensitivity to erythromycin and carbomycin.

The main physical characteristics of the constituents, spiramycin I, II and III, are summarised in the following Table I.

TABLE I

|  | Spiramycin I | Spiramycin II | Spiramycin III |
|---|---|---|---|
| Crude formula | $C_{46-48}H_{79-83}O_{15-17}N_2$ | $C_{46-48}H_{79-83}O_{15-16}N_2$ | $C_{46-48}H_{79-83}O_{15-16}N_2$ |
| Elementary composition, percent: |  |  |  |
| C | 60.3 | 61.6 | 61. |
| H | 8.7 | 8.5 | 8.5. |
| O | 28.5 | 26.8 | 26.7. |
| N | 3.2 | 3.1 | 3.0. |
| Molecular weight (ebullioscopy) | About 800 | About 800 | About 900. |
| Neutral equivalent | 463 | 464 | 473. |
| pk. b | 7.7 | 7.6 | 7.6. |
| M.p. (on the Maquenne block), °C | 134–137 | 130–133 | 128–131. |
| $[\alpha]_{D20}$ (c.=1%, methanol) | −96° | −86° | −83°. |
| $[\alpha]_{D20}$ (c.=1%, ethanol) | −91° | −80° | −79°. |
| $[\alpha]_{D20}$ (c.=1%, chloroform) | −57° | −55° | −50°. |
| Ultraviolet spectrum (in solution in ethanol): |  |  |  |
| Wavelength of the maximum absorption, m$\mu$ | 232 | 232 | 232. |
| E 1%/1 c.m. at 232 m$\mu$ | 322 | 307 | 327. |
| Chromatography on paper [1] Rf | 0.04 | 0.15 | 0.22. |

[1] Chromatography on Whatman paper No. 1 impregnated with buffer having a pH value 9 ($Na_2HPO_4$, $12H_2O$ at a concentration 23.8 g./l.) using as developer solvent the light phase of the cyclohexane-methylisobutylketone-water system (85 : 15 : 25 volumes). Descending technique—Displacement of the solvent front 40 cm. in 4 hours at 25° C. Biological development on sewn gelose plate.

Figure 2:
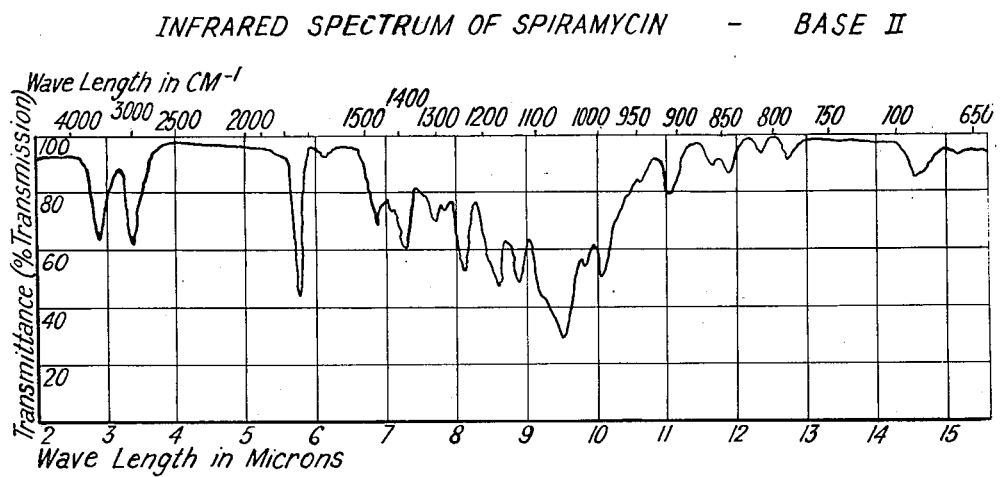
Figure 3:
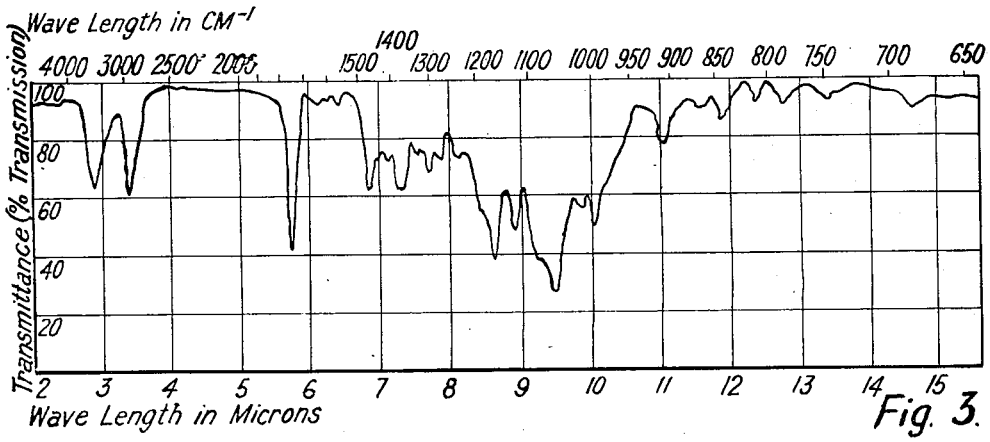

The infra-red absorption spectra of these constituents have been determined and are represented by FIGURE 1 (spiramycin I), FIGURE 2 (spiramycin II) and FIGURE 3 (spiramycin III), in which the wavelengths have been plotted in microns (lower scale) and in cm.$^{-1}$ (upper scale) along the abscissae, and the percent transmission has been plotted along the ordinates. In Table II, the main absorption bands for the three products are indicated:

TABLE II

*Infra-red absorption spectrum of spiramycin bases I, II and III*

The spectrum was measured on the solid product in the form of tablets with potassium bromide. Position of the absorption bands expressed in cm.$^{-1}$.

TABLE II—Continued

| Base I | Base II | Base III |
|---|---|---|
| 3470 strong. | 3460 strong. | 3470 strong. |
| 2970 strong. | 2970 strong. | 2970 strong. |
| 2940 strong. | 2940 strong. | 2940 strong. |
| 1735 strong. | 1740 strong. | 1740 strong. |
| 1455 medium. | 1457 medium. | 1460 medium. |
|  |  | *1380* medium. |
| 1378 medium. | 1372 medium. | 1370 medium. |
| *1317* medium. |  |  |
|  | 1300 medium. | 1300 medium. |
| 1275 medium. | 1275 medium. | 1280 medium. |
| 1237 medium. |  | 1240 medium. |
|  | *1232* strong. |  |
|  |  | *1185* medium. |
| 1160 strong. | 1160 strong. | 1162 strong. |
| 1122 strong. | 1122 strong. | 1122 strong. |
| 1090 strong. | 1085 strong. | 1085 strong. |
| 1052 very strong. | 1052 very strong. | 1052 very strong. |
| 1015 strong. | 1015 strong. | 1015 strong. |
| 993 strong. | 993 strong. | 995 strong. |
|  | *940* medium. |  |
| 905 medium. | 905 medium. | 906 medium. |
| 865 feeble. | *860* medium. | 865 feeble. |
| 840 medium. | 840 medium. | 842 medium. |
| 810 feeble. | 810 feeble. | 810 medium. |
| 782 medium. | 782 medium. | 782 medium. |
|  |  | 695 feeble. |
|  | *685* medium. | 685 feeble. |

The spectral differences between the three products are principally differences in the relative intensity of the absorption bands. These differences are found for the spectra in solution in carbon tetrachloride, which shows that they are not due to different states of crystallisation.

The individual constituents can, therefore, be defined in summary form as follows:

*Spiramycin I*

A basic substance soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 60.3 |
| Hydrogen | 8.7 |
| Oxygen | 28.5 |
| Nitrogen | 3.2 | which basic substance displays, in ethyl alcohol solution a maximum absorption at 232 m$\mu$, has a molecular weight determined by the ebullioscopic method of about 800, a neutral equivalent of 463, a dissociation constant pk. b. of 7.7, a melting point on the Maquenne block of 134–137° C., has optical rotations $[\alpha]_D^{20}$ in methanol (c.=1%) of −96°, in ethanol (c.=1%) of −91° and in chloroform (c.=1%) of −57°, and which in solid form exhibits characteristic absorption in the infra-red region of the spectrum at the following frequencies expressed in reciprocal centimetres: 3470, 2970, 2940, 1735, 1455, 1378, 1317, 1275, 1237, 1160, 1122, 1090, 1052, 1015, 993, 905, 865, 840, 810, 782.

*Spiramycin II*

A basic substance soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 61.6 |
| Hydrogen | 8.5 |
| Oxygen | 26.8 |
| Nitrogen | 3.1 | which basic substance displays, in ethyl alcohol solution a maximum absorption at 232 m$\mu$, has a molecular weight determined by the ebullioscopic method of about 800, a neutral equivalent of 464, a dissociation constant pk. of 7.6, a melting point on the Maquenne block of 130–133° C., has optical rotations $[\alpha]_D^{20}$ in methanol (c.=1%) of −86°, in ethanol (c.=1%) of −80° and in chloroform (c.=1%) of −55°, and which in solid form exhibits characteristic absorption in the infra-red region of the spectrum at the following frequencies expressed in reciprocal centimetres: 3460, 2970, 2940, 1740, 1457, 1372, 1300, 1275, 1232, 1160, 1122, 1085, 1052, 1015, 993, 940, 905, 860, 840, 810, 782, 685.

*Spiramycin III*

A basic substance soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 61 |
| Hydrogen | 8.5 |
| Oxygen | 26.7 |
| Nitrogen | 3.0 | which basic substance displays, in ethyl alcohol solution a maximum absorption at 232 m$\mu$, has a molecular weight determined by the ebullioscopic method of about 900, a neutral equivalent of 473, a dissociation constant pk. b. of 7.6, a melting point on the Maquenne block of 128–131° C., has optical rotations $[\alpha]_D^{20}$ in methanol (c.=1%) of −83°, in ethanol (c.=1%) of −79° and in chloroform (c.=1%) of −50°, and which in solid form exhibits characteristic absorption in the infra-red region of the spectrum at the following frequencies expressed in reciprocal centimetres: 3470, 2970, 2940, 1740, 1460, 1380, 1370, 1300, 1280, 1240, 1185, 1162, 1122, 1085, 1052, 1015, 995, 906, 865, 842, 810, 782, 695, 685.

The present invention includes not only spiramycin but the individual constituents I, II and III and mixtures of any of these.

Spiramycin is particularly active against gram positive bacteria but is only slightly active against gram negative bacteria. It also has some activity against mycobacteria. It is very active against anaerobic bacteria and in particularly *Clostridium septicum* and *Clostridium histolyticum*. Table III shows the antibacterial spectrum of a partially purified specimen, the activity being determined in a liquid medium.

TABLE III

| Strains | Possible resistance | Incubation | Activity $\mu$g./cc. |
|---|---|---|---|
| *Staphy. aureus* 209 P | | 16 hrs. at 37° | 1.4 |
| *Staphy. aureus* B₃ | Penicillin-streptomycin. | do | 3.5 |
| *Staphy. aureus* 2700 R 16 | Streptothricin-streptomycin-neomycin. | do | 1.6 |
| *Staphy. aureus* Hb | Chlortetracyclin-oxytetracyclin. | do | 1.6 |
| *Staphy. aureus* Beaujon 3. | Chlortetracyclin-oxytetracyclin-chloramphenicol-penicillin-streptomycin. | do | 1.6 |
| *Klebs. pneumoniae* ATCC 9997. | | do | 33 |
| *Bac. cereus* ATCC 6630 | | 16 hrs. at 28° | 2.7 |
| *Micro. citreus* | | 16 hrs. at 37° | 5.1 |
| *Sarc. lutea* ATCC 9341 | | 40 hrs. at 28° | 0.8 |
| *Strept. faecalis* | | 16 hrs. at 37° | 1 |
| *Strept. faecalis* ATCC 9790. | | do | 1 |
| *Strept. hemolyticus* | | do | 0.6 |
| *Strept. viridans* | | do | 3.1 |
| *Diplo. pneumoniae* | | do | 0.2 |
| *Neisseria catarrhalis* | | 40 hrs. at 37° | 10.3 |
| *Mycobact. sp.* ATCC 607. | | do | 85 |
| *Mycobact. sp.* ATCC 607 NR neomycin. | | do | 38 |
| *Mycobact. sp.* ATCC 607 SR streptomycin. | | do | 38 |
| *Corynebact. pseudodiphtericum.* | | do | 3.5 |
| *Bac. subtilis* ATCC 6633 | | 16 hrs. at 37° | 3.75 |
| *Brucella bronchiseptica* CN-387. | | do | 75 |
| *Bac. mycoides* | | 16 hrs. at 28° | 2.3 |
| *Mycobact. phlei* | | 40 hrs. at 37° | 33 |
| *Mycobact. parasmegmatis.* | | do | 166 |
| *Gaff. tetragena* | | 16 hrs. at 37° | 0.8 |

Spiramycin is very active in vivo in the mouse by the oral and subcutaneous routes against streptococcal, pneumococcal and staphylococcal infections at small fractions of the maximum tolerated doses. It has been found to be active against malaria in mice infected with *P. Berghei*. It is also preventive and curative in rickettsial infections in the mouse. Its toxicity is very low; in the mouse it is well tolerated at an oral dose of 5 g./kg. The lethal dose ($LD_{50}$), being the dose at which the mortality rate of the treated animals reaches 50%, is 1.5 to 2.5 g./kg. by the subcutaneous route and from 0.15 to 0.25 g./kg. by the intravenous route.

The organism which produces the new antibiotic substance of the present invention is a species of the genus Streptomyces. It has been deposited in NRRL, at Peoria, Illinois, United States of America, as NRRL No. 2420, and (together with the mutants of the organism, except where the context does not permit) is hereinafter designated simply as NRRL No. 2420. This micro-organism has been isolated from a sample of earth obtained in a field in the vicinity of Peronne in the department of Somme, France. The method of isolation was as follows: the sample of earth was suspended in distilled sterile water and then diluted; a small quantity of the diluted suspension was spread out on a Petri dish containing nutritive agar. After incubation for seven days at 28° C. the colony of NRRL No. 2420 was withdrawn by means of a platinum wire and used to seed slants of nutritive agar in order to obtain greater quantities of the micro-organism.

By using the classification of Bergey's Manual of Determinative Bacteriology (6th edition 1949) for the genus Streptomyces, this organism may be considered as related to *Streptomyces griseolus*, originally described by Waksman under the name of Actinomyces 96 [Soil Science 8, 121 (1919)]. As will be seen below, there are certain differences between the organism described by Waksman and NRRL No. 2420 so that the two Streptomyces cannot definitely be regarded as belonging to the same species. Some properties of NRRL No. 2420, in particular the production of a brown pigment in a synthetic medium and on potato, would also permit classifying it near to *Streptomyces fimicarius*. However, the production of the pigment by NRRL No. 2420 is in both these cases extremely weak and it differs from *S. fimicarius* in a number of other characteristics. Finally, the strain NRRL No. 2420 has shown variable properties in the course of attempts to identify it and the description given below corresponds to the characteristics most frequently observed.

*Microscopic morphology*

Cultivated on Czapek glucose-agar, this strain produces branched filaments. In conditions favourable to culture, there may be rapidly observed the formation of chains of spores which become attached to the principal filaments either separately or grouped in arborescences. The form of the sporulating filaments may be either simply reverted, in tendril form or irregularly shaped. At the axilla of the sporulating filaments, unsegmented elements are frequently found in the form of tendrils with several tight spirals. The spores in general vary from short oval to spherical form.

*Form of the colonies*

Single spore cultures on asparagine-agar show round colonies whose configuration may vary according to the degree of development.

In dense cultures the colonies remain small, rounded and hemispherical and in certain cases display a more or less pronounced central depression. Sporulation is rapid and generally extends over the whole colony or at the circumference with a tendency to form arborescences round the colony. The culture of the aerial mycelium is at first white, turning to grey at the moment of sporulation.

In cases where the colonies are less numerous, their form is rather variable but that most frequently observed is of a round colony which may extend to 10 mm. diameter. The yellowish vegetative mycelium, which has lobed edges, forms deep radial folds and several concentric ridges, generally leaving a central depression. Cracks appear along the folds, in particular at the centre of the colony, showing the underside of the vegetative mycelium. The aerial mycelium which is at first white (very slightly tinted yellowish-pink) rapidly assumes a grey hue at the moment of sporulation, sometimes more intensely at the external part of the colony.

*Cultural characteristics—biochemical properties*

The cultural characteristics and biochemical reactions are given in the following table. The culture media employed have for the most part been prepared in accordance with the formulae published by S. A. Waksman in "The Actinomycetes" (1950 Chronica Botanica Company, Waltham, Mass., U.S.A., pp. 193–197).

The numbers assigned for the different media in "The Actinomycetes" are retained here.

*1. Cultural characteristics*

| Medium | Vegetative mycelium | Aerial mycelium | Sporulation | Exopigment |
|---|---|---|---|---|
| Synthetic agar (Czapek's medium) No. 1. | Yellowish to greyish developing almost exclusively beneath the surface. Growth above the surface is restricted almost entirely to aerial mycelium. | White turning to grey at the moment of sporulation. | Rapid | Very pale yellowish brown. |
| Synthetic glucose agar | Yellowish to orange | Yellowish white | Slower and greyish | Very pale reddish brown. |
| Asparagine agar (No. 3) | Yellowish lobed | White | Grey, with slight tendency to greenish-yellow. May form arborescences at the borders of the colony. | Pale brownish-yellow. |
| Calcium malate agar | Rapid development (No. 1) | Resembling that on synthetic medium | | No exopigment. |
| Tyrosine agar | Practically no development | | | Do. |
| Glucose broth | Moderate growth. Yellowish | Very slight development. | | Pale amber yellow or no pigment. |
| Peptonised agar broth (No. 5). | Amber-yellow | White at the border of the culture. | | Slight yellow-brown or no pigment. |
| Peptonised glucose agar. | Yellowish | Slight development. Whitish. | Present or absent according to the cultures, yellowish-grey if present. | Pale yellowish brown or no pigment. |
| Emerson's medium | Orange-yellow to brownish-yellow. | White, more development at the edge of the culture. | do | Do. |
| Potato | Light to dark brown according to the culture. | Powdery surface with greyish hue. | Present or absent according to the cultures, greyish. | Variable pale brown to reddish-brown which may colour the potato and the water at the bottom of the tube. |

2. Biochemical properties

*Milk.*—At 26° C.: Culture forming velum. Partial peptonisation in one month without visible coagulation. The peptonised zone becomes reddish or orange-brown in colour. On milk with bromocresol-purple: pH unaltered or tending to alkalinity according to the culture.

At 37° C.: Less development. Occasional flocculation, partial peptonisation.

*Gelatine.*—(Formulae Nos. 7 and 8, Waksman).

*Moderate liquefaction.*—Yellow turbidity and flocculence in the liquefied portion. Pigment: variable, pale orange-brown in the liquefied portion, more pronounced on the glucose medium.

*Nitrites.*—Reduction of nitrates to nitrites occurs in a synthetic medium (in the presence of saccharose). In organic medium the reactions for detecting nitrites are negative.

*Utilisation of different sources of carbon.*—These tests have been carried out using the method of Pridham and Gottlieb [J. Bact. 56, 107–114 (1948)]. Substances well utilised: Glycerine, arabinose, glucose, galactose, levulose, mannose, lactose, rhamnose, starch, mannitol. Substances utilised more slowly (cultures well developed but slower) or irregularly: xylose, saccharose, maltose, inositol. Substances not utilised: raffinose, erythritol, dulcitol, sorbitol.

*Comparison between S. griseolus and NRRL No. 2420.*—The following table summarises some of the characteristics by means of which the strain of *S. griseolus* described by Waksman and the strain producing spiramycin may be relating or differentiated.

|   | Streptomyces griseolus | NRRL No. 2420 |
|---|---|---|
| Microscopic morphology. | Spiral forms not observed. Spores oval to spherical. | Spiral forms present. Spores oval to spherical. |
| Synthetic agar | Predominance of grey aerial mycelium. No soluble pigment. | Predominance of grey aerial mycelium. Very pale yellow-brown soluble pigment. |
| Glucose broth | Pigment pale brown or absent. | Pigment amber-yellow or absent. |
| Gelatine | Liquefied. Yellowish pellicle. | Liquefied. Pale yellow-brown pigment. |
| Potato | Cream to black. Potato becoming brown. | Light to dark brown. Potato coloured brown. |
| Milk | Coagulated, peptonised. | At 26° C: Peptonised without visible coagulation. |
| Pigment | Formation of pale brown pigment. | Formation of pale yellowish to brownish pigment. |

According to a feature of the invention, a process for producing spiramycin comprises inoculating an aqueous nutrient medium with a culture of the NRRL No. 2420, allowing aerobic fermentation to take place and separating from the culture medium the spiramycin thus formed. The culture medium also contains the antibiotic substance known as Congocidin which, however, does not possess the same useful properties as spiramycin and which can be isolated in crystalline form. The separation of the two antibiotic substances is readily achieved as will be described in detail hereinafter.

The fermentative growth of NRRL No. 2420 may be effected by surface-culture technique but submerged culture methods are generally to be preferred.

The fermentation may, in particular, be carried out according to the following scheme:

Culture on agar
↓
Culture in agitated Erlenmeyer flasks
↓
Culture in seed tank
↓
Producer culture in tank fermenters The nutrient medium contains, in common with media in which other fungi are grown for the production of antibiotic substances, a source of assimilable carbon; a source of assimilable, organic or inorganic nitrogen, certain mineral salts such as phosphates, and traces of various metals which are usually found as impurities in the other constituents of the medium. As a source of assimilable carbon, there may be used lipids (a vegetable or animal oil), various polyols (such as glycerol) and preferably assimilable carbohydrates such as ordinary starch, the so-called soluble starches, and sugars such as sucrose, glucose, maltose and dextrose and other water-soluble or partially water-soluble carbohydrate substances such as sugar alcohols. Suitable sources of assimilable nitrogen include a wide variety of substances such as the amino acids, casein, both hydrolysed and unhydrolysed, fish meal, soya bean meal, meat extracts, liver cake, distillers solubles, yeast extracts or autolysates and various other nitrogenous substances of vegetable or animal origin. Chemicals such as urea, nitrates, and ammonium compounds may also be added to the nutrient media as a source of nitrogen. Corn steep liquor, because of the wide variety of both organic and inorganic substances contained therein, has been found to be a valuable addition to the fermentation media. It is also preferable to add to the medium essential mineral salts such as sodium salts (for example the chloride), calcium salts (for example the carbonate) etc.

The pH of the medium is brought substantially to neutrality before sterilisation, preferably to between pH 6 and 7. Fermentation is carried out at a temperature of 24–28° C., preferably at 26° C. The development of the producer culture is not very rapid. It may, however, be considered to be complete after 3–4 days. The principal characteristics of the fermentation are first a lowering of the pH to 6.4, then, after about 30 hours, a rise of the pH to 7.5 and occasionally above that value. It appears that this elevation of pH coincides with the end of the consumption of glucose. The antibiotic activity due to spiramycin increases regularly from the beginning of the fermentation. Although aeration is not a critical factor and may vary within quite wide limits, it is preferable to operate with an aeration of 0.5 to 2 litres of air per litre of broth per minute.

Spiramycin may be isolated from the fermentation liquors by various methods. The method which has so far been found to be preferable is solvent extraction. A solvent may be used which leaves in the residual broth substances formed simultaneously in the course of fermentation such as, for example, Congocidin. There may also be used a solvent which extracts part of these impurities which are eliminated in the course of subsequent treatment. This extraction is carried out after filtration of the fermentation broth in the presence of filter-aids at a pH between 7 and 9. The extraction is carried out at a pH between 8 and 11, preferably at pH 9, by means of a water-immiscible solvent of the group of alcohols (in particular butanol), aliphatic ketones (e.g. methylethyl ketone or methylisobutyl ketone), halogenated aliphatic hydrocarbons (e.g. chloroform) aromatic hydrocarbons (e.g. benzene), and esters such as ethyl acetate or amyl acetate. The solution thus obtained is then extracted with water at an acid pH (below 4 and preferably between 2 and 3). The aqueous extract is then concentrated and extracted at pH 9 with chloroform or benzene. The organic solution is then concentrated, dehydrated, brought to pH 5 with sulphuric acid and the sulphate of the antibiotic thus formed is precipitated with ether.

The primary organic extract may also be concentrated directly and thereafter extracted with water at pH 2; the aqueous solution obtained is then treated as hereinbefore described. The crude sulphate thus obtained may subsequently be purified by successive extraction with organic solvents or with water or by chromatography.

The following examples show how the process of the invention may be put into practice; the arbitrary unit chosen is the smallest quantity of a purified product which dissolved in 1 cc. of an appropriate culture medium inhibits the development of *Staphylococcus aureus* (strain F.D.A. 209 P); for the product considered this quantity is 1 microgram.

EXAMPLE I 40 litres of the following medium:

| | Percent by weight |
|---|---|
| Corn-steep (dry extract 50%) | 4 |
| Glucose | 2 |
| Calcium carbonate | 0.5 |
| Sodium chloride | 0.5 |
| Magnesium sulphate | 0.1 | are charged into a 75 litre fermenter. The pH is adjusted to 7.0 and the mixture is sterilised at 120° C. for 45 minutes. After cooling to 26° C. the medium is inoculated with 250 cc. of a culture of NRRL No. 2420 in an agitated Erlenmeyer flask. The culture in the fermenter is aerated and agitated for 25 hours and serves for the inoculation of the producer culture.

The latter is carried out in a 350 litre fermenter charged with 200 litres of the following medium:

| | Percent by weight |
|---|---|
| Glucose | 2 |
| Soya flour | 4 |
| Distiller's solubles | 0.5 |
| Sodium chloride | 2 |
| Calcium carbonate | 1 |

The pH before sterilisation is 6.8. The development of the producer culture is not very rapid but it may, however, be considered to be complete after 3–4 days at 26° C. with an aeration of 12 cubic metres per hour and an agitation of 400 revolutions per minute. A lowering of the pH to 6.4 is first noted and then after about 30 hours, a rise to 7.5. After four days the activity obtained is 92 units/cc.

EXAMPLE II 200 litres of the following medium are charged into a 350 litre fermenter:

| | Percent by weight |
|---|---|
| Glucose | 1 |
| Corn-steep (50% dry extract) | 3 |
| Monopotassium phosphate | 0.1 |
| Magnesium sulphate | 0.1 |
| Sodium chloride | 2 |
| Calcium carbonate | 0.5 |

The pH is adjusted to 7.0 with caustic soda and the medium is sterilised for 45 minutes at 120° C. The medium is then brought to 26° C. and inoculated as in Example I. The fermentation medium is then aerated and agitated and the maximum activity is obtained in 60 hours and is 129 units/cc.

EXAMPLE III

A fermentation is carried out as in Example II but the glucose is replaced by 2% of saccharose and the amount of cornsteep altered to 2% (by weight).

Under these conditions the maximum activity is 90 units/cc. in 40 hours.

EXAMPLE IV 15 litres of the following medium are charged into a 30 litre fermenter:

| | Percent by weight |
|---|---|
| Glucose | 3 |
| Yeast autolysate | 1 |
| Sodium chloride | 2 |
| Magnesium sulphate | 0.1 |
| Monopotassium phosphate | 0.1 |
| Calcium carbonate | 0.5 |

The pH is adjusted to 7.0 with caustic soda and, after sterilisation and cooling to 26° C., the medium is inoculated with 1 litre of inoculum in a fermenter in the cornsteep medium previously described. An activity of 144 units/cc. is obtained in 4 days of culture.

EXAMPLE V 210 litres of fermentation broth at pH 8 are mixed with 10 kg. of filter-aid (Hyflo Supercel) and filtered in a filter press. The filter cake is washed with 50 litres of water and the filtrate, comprising 230 litres containing 15.8 million units, is basified to pH 9 by means of 10% caustic soda and extracted with 46 litres of methylisobutyl ketone. The solvent is separated and the aqueous base is re-extracted with 23 litres of methylisobutyl ketone. After decantation the two extracts are combined and washed with 6 litres of water which has been made alkaline to pH 9. The antibiotic contained by the solvent is extracted with water at 5° C., the pH being lowered to 3 with a 5% solution of phosphoric acid. Carrying out this extraction with 8 litres and then (3 times) with 4 litres of water, the whole of the antibiotic is found in the aqueous phase. The aqueous solution is adjusted to pH 6.5 with dilute caustic soda and is concentrated in vacuo at a temperature not exceeding 35° C. There is thus obtained 1750 cc. of the solution containing 14.6 million units. The antibiotic is extracted from the alkaline aqueous solution at pH 9 once with 1 litre and then twice with 0.5 litres of benzene, the benzene extract is concentrated in vacuo at a temperature not exceeding 30° C. to a volume of 100 cc., 100 cc. of normal butyl alcohol are then added and the pH is adjusted to 5 by the addition of a solution of demi-normal sulphuric acid in butanol. The solution is re-concentrated to 100 cc. and the sulphate of the antibiotic is precipitated with 2 litres of ether. The sulphate, which is precipitated in the form of a white powder, is filtered, washed with ether and dried.

9.6 g. of sulphate with a titre of 1320 units/mg. are obtained which corresponds to a yield of 80%.

EXAMPLE VI 185 litres of fermentation broth are filtered as in Example V. The filtrate, comprising 155 litres containing 12.4 million units, is basified to pH 9 by the addition of 10% caustic soda and is extracted successively with 40 litres and 20 litres of normal butanol. The combined butanol extracts are concentrated in vacuo to 10 litres, the temperature not exceeding 30° C. The butanol solution is then extracted once with 8 litres and twice with 3 litres of water, the pH being lowered to 2 with sulphuric acid. The aqueous solution, adjusted to pH 6.5 with a solution of dilute caustic soda, is concentrated in vacuo to 1500 cc. at a temperature not exceeding 30° C. The aqueous solution then contains 8 million units.

The aqueous solution, basified to pH 9, is extracted with chloroform (3 times 700 cc.) and the chloroform extracts are concentrated in vacuo and treated as in Example I.

7.4 g. of the antibiotic in the form of the sulphate are obtained with a titre of 746 units/mg., i.e. a yield of 44%.

EXAMPLE VII 30 g. of the crude sulphate of the antibiotic are dissolved in 700 cc. of water. The pH is brought to 9 by the addition of caustic soda and extraction is carried out (3 times) with 300 cc. of benzene. The combined benzene extracts are washed with 200 cc. of water at pH 9 and the solution is evaporated to dryness at a low temperature.

24.2 g. of spiramycin base are obtained with a titre of 2150 units/mg.

The separation of the three constituent compounds has been effected, as indicated above, by Craig's countercurrent distribution method. This is performed by means of a 60-tube Craig apparatus (volume of each phase 10 ml. per tube):

Solvents:
{ Cyclohexane
  Buffer pH 9 (solution containing 23.8 g./l. of $Na_2HPO_4.12H_2O$) }

Temperature: 25° C.

50 mg. of spiramycin base to be analysed are dissolved in the solvent of the first tube and 59 transfers are effected in accordance with the conventional method.

After distribution, the concentration in each tube is determined by biological titration. The distribution curve is plotted and the theoretical curve is calculated by the method indicated by L. C. Craig (Technique of Organic Chemistry, volume III, Arnold Weissberger, editor; Interscience Publishers, New York).

Figure 4:
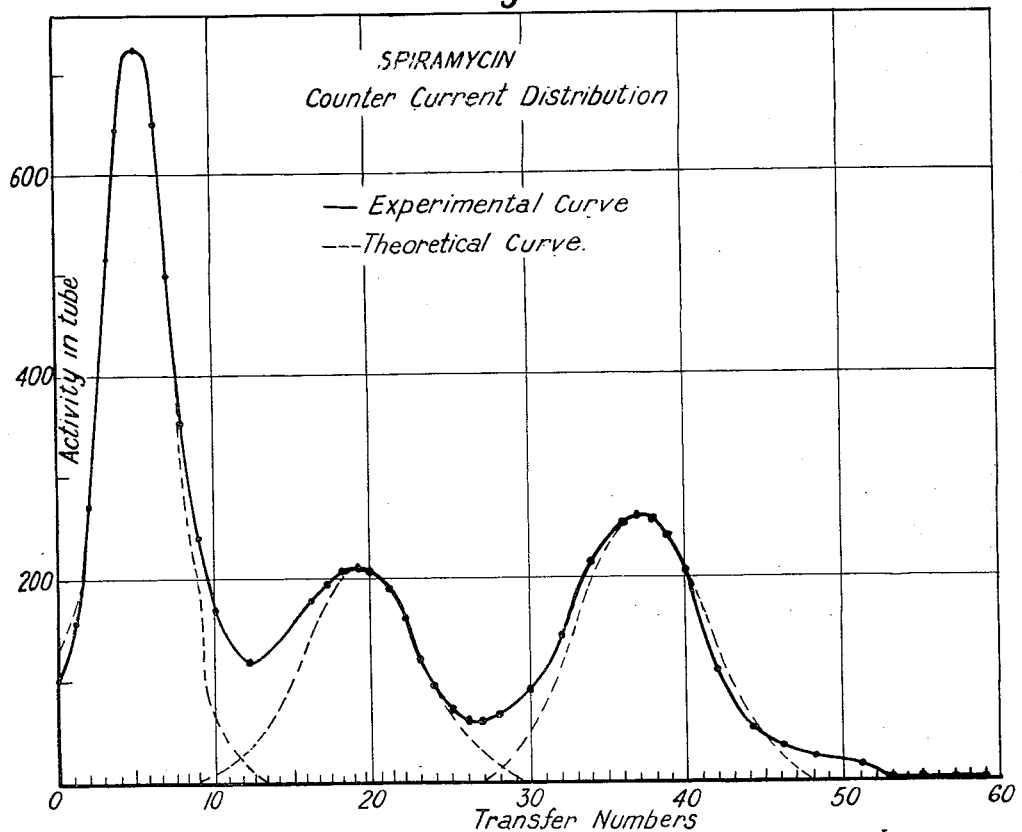

The curve shown in FIGURE 4 of the drawings, relating to the analysis of a specimen of spiramycin, shows that the latter contains three active substances characterised by the following constants:

Spiramycin I—Maximum concentration in tube 5:

Partition ratio $K_I$ $$= \frac{\text{Concentration of spiramycin I in cyclohexane}}{\text{Concentration of spiramycin I in the aqueous phase}} = 0.092$$

Spiramycin II—Maximum concentration in tube 19:
Partition ratio $K_{II}$ $$= \frac{\text{Concentration of spiramycin II in cyclohexane}}{\text{Concentration of spiramycin II in the aqueous phase}} = 0.475$$

Spiramycin III—Maximum concentration in tube 37:
Partition ratio $K_{III}$ $$= \frac{\text{Concentration of spiramycin II in cyclohexane}}{\text{Concentration of spiramycin II in the aqueous phase}} = 1.68$$

Craig's method of calculation indicates the following proportions of each of the compounds in the mixture:

Spiramycin I=48%
Spiramycin II=23%
Spiramycin III=29%

The fact that the spiramycin antibiotics of the present invention differ from others of comparable bacterial spectrum is shown by the comparative data set out in Tables IV and V which follow:

TABLE IV

|  | Spiramycin I | Spiramycin II | Spiramycin III | Congocidin [1] | Anisomycin [2] | Hydroxy-streptomycin [3] |
|---|---|---|---|---|---|---|
| Crude formula | $C_{46-48}H_{79-83}O_{16-17}N_2$ | $C_{46-48}H_{79-83}O_{15-16}N_2$ | $C_{46-48}H_{79-83}O_{15-16}N_2$ | $C_{10}H_{21}O_3N_5.HCl$ | $C_{14}H_{19}O_4N$ | $C_{21}H_{39}N_7O_{13}3HCl$ |
| Elementary composition, percent: |  |  |  |  |  |  |
| C | 60.3 | 61.6 | 61 | 40.7 | 63 | 35.63. |
| H | 8.7 | 8.5 | 8.5 | 7.5 | 7.27 | 5.99. |
| O | 28.5 | 26.8 | 26.7 | 16.2 | 23.98 |  |
| N | 3.2 | 3.1 | 3 | 23.6 | 5.2 | 13.87. |
| Cl |  |  |  | 12 |  | 15.05. |
| Rotatory power: |  |  |  |  |  |  |
| Base $[\alpha]_D^{25}$ (c=1% methanol) | −96° | −86° | −83° |  | −30° |  |
| Hydrochloride $[\alpha]_D^{25}$ (c=1% water) | −73° | −73° | −71° | 0 |  | −95°. |
| Ultraviolet spectrum: Maximum absorption | 232 mμ | 232 mμ | 232 mμ | 237 and 297 mμ | 224, 277 and 283 mμ. | Not indicated. |
| Antibiotic activity: |  |  |  |  |  |  |
| Fungi | Inactive | Inactive | Inactive |  | Active | Do. |
| Protozoa | Inactive (save on Plasmodium) | Inactive (save on Plasmodium) | Inactive (save on Plasmodium) | Active | do | Do. |
| Bacteria | Active on Gram+ | Active on Gram+ | Active on Gram+ | Active on Gram+ and Gram− | Inactive | Active on Gram+ and Gram−. |
| Toxicity on mice sub-cutaneous administration $DL_{50}$ | 1.5 to 2.5 g./kg | 1.5 to 2.5 g./kg | 1.5 to 2.5 g./kg | 0.25 g./kg |  | Not indicated. |

[1] According to Cosar et Col.—Comptes Rendus de l'Academie des Sciences 234, 1498 (1952).
[2] According to Tanner et Col.—United States Patent No. 2,691,618 of the 12th October 1954.
[3] According to Benidict et Col.—United States Patent No. 2,617,755 of the 11th November 1952.

TABLE V

|  | Spiramycin I | Spiramycin II | Spiramycin III | Erythromycin [1] | Carbomycin [2] | Leucomycin [3] |
|---|---|---|---|---|---|---|
| Productive organism | S. ambofaciens | S. ambofaciens | S. ambofaciens | S. erythreus | S. halstedii | S. kitasatoensis. |
| Crude formula | $C_{46-48}H_{79-83}O_{16-17}N_2$ | $C_{46-48}H_{79-83}O_{15-16}N_2$ | $C_{46-48}H_{79-83}O_{15-16}N_2$ | $C_{38-39}H_{69-71}NO_{13}$ | $C_{41-42}H_{67-69}NO_{16}$ | $C_{33-38}H_{54-56}NO_{11-13}$. |
| Elementary composition, percent: |  |  |  |  |  |  |
| C | 60.3 | 61.6 | 61 | 61.05 | 59.89 | 61.3. |
| H | 8.7 | 8.5 | 8.5 | 9.43 | 7.96 | 8.6. |
| O | 28.5 | 26.8 | 26.7 | 27.6 | 30.37 | 28.07. |
| N | 3.2 | 3.1 | 3.0 | 1.91 | 1.78 | 2.03. |
| Neutral equivalent | 463 | 464 | 473 | 754±7 | 836±7 |  |
| pK b | 7.7 | 7.6 | 7.6 | 8.7 | 7.2 | 7.5. |
| Melting point, degrees | 134–137 | 130–133 | 128–131 | 136–140 | 212–214 | 126–129. |
| $[\alpha]_D^{20}$ (c=1% ethanol), degrees | −91 | −80 | −79 | −78 |  | −67°1. |
| $[\alpha]_D^{20}$ (c=1% chloroform), degrees | −57 | −55 | −50 |  | −58 |  |
| Ultra-violet spectrum: Wavelength of the maximum | 232 mμ | 232 mμ | 232 mμ | 289 mμ | 238 mμ | 232 and 285 mμ. |
| E 1%/1 cm. at the maximum | 322 | 307 | 327 | Σ=25.7 (which corresponds approximately to E 1%/1 cm.= 0.34). | 185 | 228–8.6. |
| Chromatography on paper: |  |  |  |  |  |  |
| Rf [4] | 0.04 | 0.15 | 0.22 | 0.08 | 0.12 | 0.03. |
| Rf [5] | 0.66 | 0.66 | 0.66 | 0.66 | 0.47 | 0.40. |

[1] United States Patent No. 2,653,899 of the 14th April 1952.
[2] Wagner et Col.—Am. Soc. 75, 4684 (1953).
[3] Sano et Col.—J. of Antib. (Japan) VII, 93 (1954).
[4] Chromatography on Whatman Paper No. 1, impregnated with buffer at pH 9 ($PO_4HNa_2$, $12H_2O$ in a concentration of 23.8 g./l.) with water-saturated cyclohexane methylisobutyl ketone mixture (85:15 by vol.) as developing solvent. Descending method. Displacement of the solvent front: 40 cm. in 4 hours at 25° C. Biological development on sown gelose.
[5] Chromatography on Whatman Paper No. 1, with N/10 aqueous ammonia solution. Descending method. Displacement of the solvent front: 40 cm. in 3 hours at 25° C. Biological development on sown gelose.

We claim:
1. An antibiotic selected from the group of substances having the following characteristic properties:

A basic substance spiramycin I soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 60.3 |
| Hydrogen | 8.7 |
| Oxygen | 28.5 |
| Nitrogen | 3.2 | which basic substance displays, in ethyl alcohol solution a maximum absorption at 232 m$\mu$, $E_{1cm}^{1\%}$ at 232 millimicrons = 322 has a molecular weight determined by the ebullioscopic method of about 800, a neutral equivalent of 463, a dissociation constant pk. b. of 7.7, a melting point on the Maquenne block of 134–137° C., has optical rotations $[\alpha]_D^{20}$ in methanol (c.=1%) of −96°, in ethanol (c.=1%) of −91 and in chloroform (c.=1%) of −57°, and which in solid form exhibits characteristic absorption in the infra-red region of the spectrum at the following frequencies expressed in reciprocal centimetres: 3470 strong, 2970 strong, 2940 strong, 1735 strong, 1455 medium, 1378 medium, 1317 medium, 1275 medium, 1237 medium, 1160 strong, 1122 strong, 1090 strong, 1052 very strong, 1015 strong, 993 strong, 905 medium, 865 feeble, 840 medium, 810 feeble, 782 medium; and the acid salts of said basic substance;

A basic substance spiramycin II soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 61.6 |
| Hydrogen | 8.5 |
| Oxygen | 26.8 |
| Nitrogen | 3.1 | which basic substance displays, in ethyl alcohol solution a maximum absorption at 232 m$\mu$, $E_{1cm}^{1\%}$ at 232 millimicrons = 307 has a molecular weight determined by the ebullioscopic method of about 800, a neutral equivalent of 464, a dissociation constant pk. b. of 7.6, a melting point on the Maquenne block of 130–133° C., has optical rotations $[\alpha]_D^{20}$ in methanol (c.=1%) of −86°, in ethanol (c.=1%) of −80° and in chloroform (c.=1%) of −55°, and which in solid form exhibits characteristic absorption in the infra-red region of the spectrum at the following frequencies expressed in reciprocal centimetres: 3460 strong, 2970 strong, 2940 strong, 1740 strong, 1457 medium, 1372 medium, 1300 medium, 1275 medium, 1232 strong, 1160 strong, 1122 strong, 1085 strong, 1052 very strong, 1015 strong, 993 strong, 940 medium, 905 medium, 860 medium, 840 medium, 810 feeble, 782 medium, 685 medium; and the acid salts of said basic substance;

A basic substance spiramycin III soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 61 |
| Hydrogen | 8.5 |
| Oxygen | 26.7 |
| Nitrogen | 3.0 | which basic substance displays, in ethyl alcohol solution a maximum absorption at 232 m$\mu$, $E_{1cm}^{1\%}$ at 232 millimicrons = 327 has a molecular weight determined by the ebullioscopic method of about 900, a neutral equivalent of 473, a dissociation constant pk. b. of 7.6, a melting point on the Maquenne block of 128–131° C., has optical rotations $[\alpha]_D^{20}$ in methanol (c.=1%) of 83°, in ethanol (c.=1%) of −79° and in chloroform (c.=1%) of −50°, and which in solid form exhibits characteristic absorption in the infra-red region of the spectrum at the following frequencies expressed in reciprocal centimetres: 3470 strong, 2970 strong, 2940 strong, 1740 strong, 1460 medium, 1380 medium, 1370 medium, 1300 medium, 1280 medium, 1240 medium, 1185 medium, 1162 strong, 1122 strong, 1085 strong, 1052 very strong, 1015 strong, 995 strong, 906 medium, 865 feeble, 842 medium, 810 medium, 782 medium, 695 feeble, 685 feeble; and the acid salts of said basic substance.

2. An antibiotic selected from the group of substances having the following characteristic properties:

A basic substance, spiramycin I, soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 60.3 |
| Hydrogen | 8.7 |
| Oxygen | 28.5 |
| Nitrogen | 3.2 | which basic substance displays, in ethyl alcohol solution a maximum absorption at 232 m$\mu$, $E_{1cm}^{1\%}$ at 232 millimicrons = 322 has a molecular weight determined by the ebullioscopic method of about 800, a neutral equivalent of 463, a dissociation constant pk. b. of 7.7, a melting point on the Maquenne block of 134–137° C., has optical rotations $[\alpha]_D^{20}$ in methanol (c.=1%) of −96°, in ethanol (c.=1%) of −91° and in chloroform (c.=1%) of −57°, and which in solid form exhibits characteristic absorption in the infra-red region of the spectrum at the following frequencies expressed in reciprocal centimetres: 3470 strong, 2970 strong, 2940 strong, 1735 strong, 1455 medium, 1378 medium, 1317 medium, 1275 medium, 1237 medium, 1160 strong, 1122 strong, 1090 strong, 1052 very strong, 1015 strong, 993 strong, 905 medium, 865 feeble, 840 medium, 810 feeble, 782 medium and the acid salts of said basic substance.

3. An antibiotic selected from the group of substances having the following characteristic properties:

A basic substance, spiramycin II, soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 61.6 |
| Hydrogen | 8.5 |
| Oxygen | 26.8 |
| Nitrogen | 3.1 | which basic substance displays, in ethyl alcohol solution a maximum absorption at 232 m$\mu$, $E_{1cm}^{1\%}$ at 232 millimicrons = 307 has a molecular weight determined by the ebullioscopic method of about 800, a neutral equivalent of 464, a dissociation constant pk. b. of 7.6, a melting point on the Maquenne block of 130–133° C., has optical rotations $[\alpha]_D^{20}$ in methanol (c.=1%) of −86°, in ethanol (c.=1%) of −80° and in chloroform (c.=1%) of —55°, and which in solid form exhibits characteristic absorption in the infra-red region of the spectrum at the following frequencies expressed in reciprocal centimeters: 3460 strong, 2970 strong, 2940 strong, 1740 strong, 1457 medium, 1372 medium, 1300 medium, 1275 medium, 1232 strong, 1160 strong, 1122 strong, 1085 strong, 1052 very strong, 1015 strong, 993 strong, 940 medium, 905 medium, 860 medium, 840 medium, 810 feeble, 782 medium, 685 medium; and the acid salts of said basic substances.

4. An antibiotic selected from the group of substances having the following characteristic properties:

A basic substance, spiramycin III, soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

| | |
|---|---|
| Carbon | 61 |
| Hydrogen | 8.5 |
| Oxygen | 26.7 |
| Nitrogen | 3.0 | which basic substance displays, in ethyl alcohol solution a maximum absorption at 232 m$\mu$, $$E_{1\,cm.}^{1\%} \text{ at } 232 \text{ millimicrons} = 327$$

has a molecular weight determined by the ebullioscopic method of about 900, a neutral equivalent of 473, a dissociation constant pk. b. of 7.6, a melting point on the Maquenne block of 128–131° C., has optical rotations $[\alpha]_D^{20}$ in methanol (c.=1%) of −83°, in ethanol (c.=1%) of −79° and in chloroform (c.=1%) of −50°, and which in solid form exhibits characteristic absorption in the infra-red region of the spectrum at the following frequencies expressed in reciprocal centimetres: 3470 strong, 2970 strong, 2940 strong, 1740 strong, 1460 medium, 1380 medium, 1370 medium, 1300 medium, 1280 medium, 1240 medium, 1185 medium, 1162 strong, 1122 strong, 1085 strong, 1052 very strong, 1015 strong, 995 strong, 906 medium, 865 feeble, 842 medium, 810 medium, 782 medium, 695 feeble, 685 feeble; and the acid salts of said basic substance.

5. A mixture of spiramycins I, II and III, each of which is as defined in claim 1.

6. A process for the production of a synthetic antibiotic substance which comprises subjecting *Streptomyces ambofaciens,* strain NRRL 2420, to controlled aerobic cultivation in a medium containing assimilable sources of carbon, nitrogen and mineral salts until substantial antibiotic activity is produced by the said organism in the said culture medium and separating from the medium an antibiotic substance having a molecular weight between 800 and 900, and an elemental analysis showing carbon 60–61%, hydrogen 8.9–9.4%, oxygen 25.5–27% and nitrogen 3.3–3.6%, which is laevorotatory in ethyl alcohol solution and which shows a maximum absorption in the ultraviolet at 231 m$\mu$ in alcoholic solution.

7. A process for the production of a synthetic antibiotic substance which comprises subjecting *Streptomyces ambofaciens,* strain NRRL 2420, to controlled submerged aerobic cultivation at 24–28° C. in a medium containing assimilable sources of carbon, nitrogen and mineral salts until substantial antibiotic activity is produced by the said organism in the said culture medium and separating from the medium an antibiotic substance having a molecular weight between 800 and 900, and an elemental analysis showing carbon 60–61%, hydrogen 8.9–9.4%, oxygen 25.5–27% and nitrogen 3.3–3.6%, which is laevorotatory in ethyl alcohol solution and which shows a maximum absorption in the ultraviolet at 231 m$\mu$ in alcoholic solution.

8. A process for the production of a synthetic antibiotic substance which comprises subjecting *Streptomyces ambofaciens,* strain NRRL 2420, to controlled submerged aerobic cultivation at 24–28° C. in a medium containing assimilable sources of carbon, nitrogen and mineral salts for a period of 3 to 4 days and separating from the medium an antibiotic substance having a molecular weight between 800 and 900, and an elemental analysis showing carbon 60–61%, hydrogen 8.9–9.4%, oxygen 25.5–27% and nitrogen 3.3–3.6%, which is laevorotatory in ethyl alcohol solution and which shows a maximum absorption in the ultraviolet at 231 m$\mu$ in alcoholic solution.

References Cited in the file of this patent

UNITED STATES PATENTS

| | | |
|---|---|---|
| 2,617,755 | Benedict et al. | Nov. 11, 1952 |
| 2,691,618 | Tanner et al. | Oct. 12, 1954 |

OTHER REFERENCES

Cosar et al.: Comp. Rend. Acad. des Sciences, vol. 234, pp. 1498–1499, 1952.

Waksman: "Actinomycetes and Their Antibiotics" pages 54, 57, 59, 168 to 184. Pub. 1953 by Williams and Wilkens.

"Antibiotics Annual 1954–1955," published February 1955 by Medical Encyclopedia Inc., pages 724–727 and 827–830.

Stevenson: Nature, Sept. 25, 1954, pages 598–599.

Pinnert-Sindeco et al.: Abstract of Paper No. 100, presented at the 2nd Annual Symposium on Antibiotics, October 25–29, 1954.

Helv. Chem. Acta, vol. 39, 1956, p. 304.